(12) United States Patent
Xi

(10) Patent No.: US 11,351,656 B2
(45) Date of Patent: Jun. 7, 2022

(54) KEY CLAMP FOR KEY PROCESSING MACHINES AND A KEY PROCESSING MACHINE

(71) Applicant: Zhejiang Yongyuan Technology Co., Ltd, Yuyao (CN)

(72) Inventor: Yongfeng Xi, Shenzhen (CN)

(73) Assignee: Zhejiang Yongyuan Technology Co., Ltd, Yuyao (CN)

( * ) Notice: Subject to any disclaimer, the term of this patent is extended or adjusted under 35 U.S.C. 154(b) by 0 days.

(21) Appl. No.: 16/885,389

(22) Filed: May 28, 2020

(65) Prior Publication Data

US 2020/0376630 A1    Dec. 3, 2020

(30) Foreign Application Priority Data

May 28, 2019   (CN) .......................... 201910453604.4

(51) Int. Cl.
*B25B 5/02*   (2006.01)
*B23C 3/35*   (2006.01)

(52) U.S. Cl.
CPC . *B25B 5/02* (2013.01); *B23C 3/35* (2013.01)

(58) Field of Classification Search
CPC .... B25B 5/02; B25B 1/00; B25B 5/00; B25B 5/16; B25B 5/163; B23C 3/35; B23C 3/355; B23Q 3/066; B23Q 3/062; B23Q 3/061; B23Q 2003/155449
USPC .................................. 269/240, 242, 43, 248
See application file for complete search history.

(56) References Cited

U.S. PATENT DOCUMENTS

2011/0316213 A1\*  12/2011  Chen ....................... B25B 1/103
                                                         269/240

FOREIGN PATENT DOCUMENTS

| CN | 105904247 A | | 8/2016 | |
| FR | 2771956 A1 | \* | 6/1999 | ........... B25B 1/2405 |
| JP | 2001263327 A | \* | 9/2001 | |

OTHER PUBLICATIONS

Machine translation of description section of FR2771956 (Year: 1999).\*
Machine translation of description section of JP2001263327 (Year: 2001).\*

\* cited by examiner

*Primary Examiner* — Orlando E Aviles
*Assistant Examiner* — Jacob Adam Montgomery
(74) *Attorney, Agent, or Firm* — Myers Wolin, LLC

(57) ABSTRACT

A key clamp for key processing machines and key processing machine comprising a base, a first clamp and a second clamp, have the same structure and are arranged in parallel on the base, and they both have a fixed connection with the base. The first clamp comprises at least three clamping jaw and a transmission device, three clamping jaws arranged in one row, the first clamping jaw and the third clamping jaw are both fixed in relation to the base. The second clamping jaw is flexibly installed on the base. The transmission device penetrates the first clamping jaw, the second clamping jaw and the third clamping jaw, and are connected to the second clamping jaw. The key clamp can clamp house keys and automotive keys with a multitude of structures. It has the advantages of strong versatility, simple structure, easy use and reliable clamping.

10 Claims, 2 Drawing Sheets

KEY CLAMP FOR KEY PROCESSING MACHINES AND A KEY PROCESSING MACHINE

CROSS REFERENCE TO RELATED APPLICATIONS

The present application claims the benefit of Chinese patent application No. CN 201910453604.4, filed on May 28, 2019. The entire contents of the above-cited application are hereby incorporated by reference in their entirety for all purposes.

FIELD OF THE INVENTION

This disclosure relates to a key duplicating equipment, particularly to the key clamp and key processing machine.

BACKGROUND

A clamp used for a key processing machine in this area is usually used for end milling key processing machines. Locks' and keys' security performances are continuously improving, and the external structures of keys are becoming increasingly diversified. This creates the need for clamp keys with different structures with specific clamps during processing and clamping. The clamps produced with the current technology have a singular function and can only clamp keys with one or several characteristics, so they have poor general-purpose performance. To support multiple types of keys, we have to provide a multitude of special-purpose clamps, which will have the disadvantages of high cost, trouble in mounting and change, and very low efficiency. Another option is to use a multitude of small modules, which will have the disadvantages of many parts, easy loss, complex installation and inconvenient operation.

Patent application CN105904247A describes a master key clamp. The clamp comprises two clamp bodies. Each clamp body comprises a connecting base, a fixed clamping head and a movable clamping head. Each connecting base comprises an upper bottom plate and a lower bottom plate perpendicular to the upper bottom plate. Each upper bottom plate and the corresponding lower bottom plate are of an integrated structure. A sliding groove is formed in front of each upper bottom plate. The fixed clamping head and the movable clamping head are arranged in each sliding groove. A multifunctional self-adaptive face is machined on each movable clamping head. A front localization datum groove and a rear localization datum groove are formed in each upper bottom plate. The fixed clamping heads are locked through internal hexagonal locking bolts. The master key clamp has the beneficial effects that the master key clamp can be suitable for clamping and making of keys of various types in various shapes, and the problem that many keys cannot be made for many lock makers is solved.

SUMMARY

A main purpose of this solution is to provide one key clamp for key processing machines for the purpose of solving the singular function and poor general-purpose performance of existing clamps for key processing machines.

This application discloses a key clamp for key processing machines, comprising: a base; a first clamp; and a second clamp having the same structure as the first clamp; wherein the first clamp and second clamp are arranged in parallel on the base, and the first clamp and the second clamp are both connected to the base, and wherein the first clamp comprises at least three clamping jaws and a transmission device, the at least three clamping jaws comprises a first clamping jaw, a second clamping jaw and a third clamping jaw arranged in a row, wherein the first clamping jaw and the third clamping jaw are both fixed relative to the base, the second clamping jaw is flexibly installed on the base; the second clamping jaw is disposed between the first clamping jaw and the third clamping jaw, a first surface of the first clamping jaw and a second surface of the second clamping jaw facing to the first surface define a first clamping shape, a third surface of the second clamping jaw and a fourth surface of the third clamping jaw facing to the second surface define a second clamping shape, and wherein the transmission device penetrate the first clamping jaw, the second clamping jaw and the third clamping jaw in turn, and is connected to the second clamping jaw; the transmission device drives the second clamping jaw to move towards the first clamping jaw or the third clamping jaw.

Further, the first clamping shape comprises at least one jaw opening, and/or the second clamping shape comprises at least one jaw opening.

Further, the first clamping shape or the second clamping shape comprises a first jaw opening; the second clamping jaw comprises a first concave shape, the first clamping jaw or the third clamping jaw also comprises a first concave shape, the first concave shape of the second clamping jaw and the first concave shape of the first clamping jaw, or the first concave shape of the second clamping jaw and the first concave shape of the third clamping jaw jointly constitute the first jaw opening.

Further, the first clamping jaw or the second clamping jaw comprises a second jaw opening; the second clamping jaw comprises a second concave shape, the first clamping jaw or the third clamping jaw also comprises the second concave shape; the second concave shape of the second clamping jaw and the second concave shape of the first clamping jaw, or the second concave shape of the second clamping jaw and the second concave shape of the third clamping jaw jointly constitute the second jaw opening.

Further, the first clamping jaw or the second clamping jaw comprises a third jaw opening; the second clamping jaw comprises a third concave shape, the first clamping jaw or the third clamping jaw also comprises a third concave shape; the third concave shape of the second clamping jaw and the third concave shape of the first clamping jaw, or the third concave shape of the second clamping jaw and the third concave shape of the third clamping jaw jointly constitute the third jaw opening.

Further, the first clamping jaw or the second clamping jaw comprises a fourth jaw opening; the second clamping jaw comprises a fourth concave shape, the first clamping jaw or the third clamping jaw also comprises a fifth concave shape; the fifth concave shape and the fourth concave shape are opposite to one another; the fourth concave shape of the second clamping jaw and the fifth concave shape of the first clamping jaw, or the fourth concave shape of the second clamping jaw and the fifth concave shape of the third clamping jaw jointly constitute the fourth jaw opening.

Further, the key clamp also comprises a limiting component, the limiting component is arranged at the end of the first clamping jaw far from the second clamping jaw, and rigidly connected to the first clamping jaw; the limiting component comprises a limiting nut and a limiting pin, wherein the limiting pin passes through the limiting nut to form a fixed connection between the limiting nut and the limiting pin; one end of the transmission device crosses out of the first clamping jaw, and is connected to the limiting nut via thread.

Further, the key clamp also comprises a drive device, and the said drive device is rigidly connected to the other end of the transmission device.

Further, the key clamp also comprises a bearing device; the bearing device is arranged around the transmission device, and at both ends where the second clamping jaw contact the first clamping jaw and the third clamping jaw.

This application also discloses a key processing machine, which comprises the aforesaid key clamp for key processing machines.

Compared to the current technologies, this solution will create the following benefits: the solution provides a key clamp for key processing machines, as well as a key processing machine, which has a multitude of clamping shapes and can clamp house keys and automotive keys with a multitude of structures such as head positioning keys, shoulder positioning keys, tubular keys, hexagonal keys, crescent keys and round keys. It can also clamp keys with a multitude of bit characteristics such as external open tooth keys, external milled tooth keys, internal milled tooth keys and dimple keys. It has the advantages of strong versatility, simple structure, easy use and reliable clamping.

Figure 1:
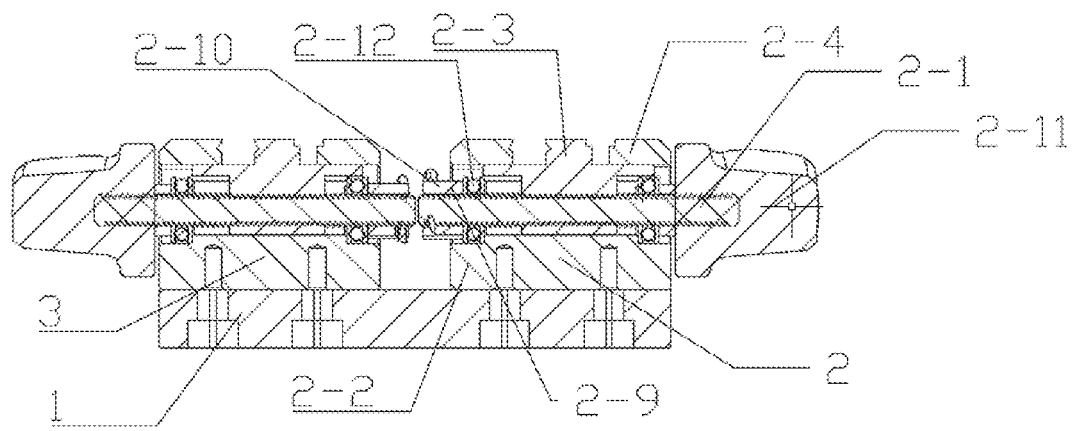
FIG. 1 shows a front perspective of a preferred embodiment for the key clamp of key processing machines under this solution.
Figure 2:
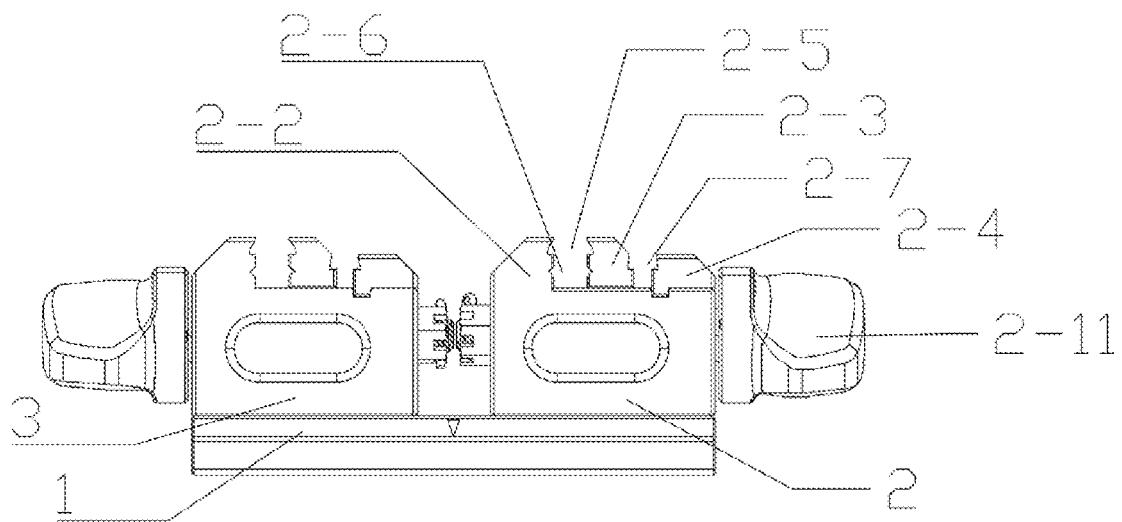
FIG. 2 shows a front view of a preferred embodiment for the key clamp of key processing machines under this solution.
Figure 3:
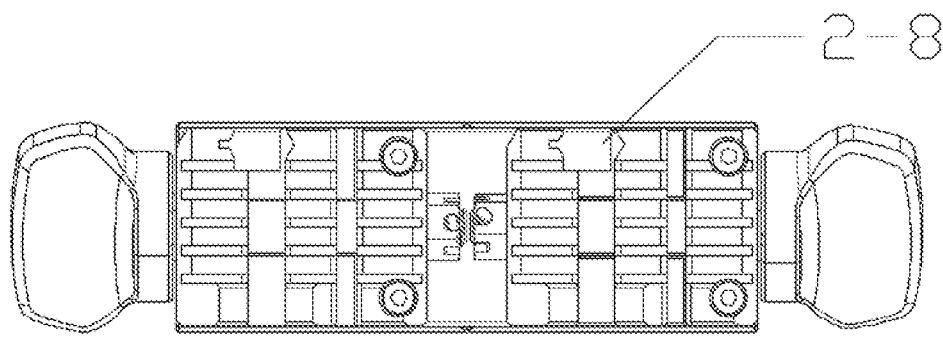
FIG. 3 shows a top view of a preferred embodiment for the key clamp of key processing machines under this solution.

The purpose, realization, functional characteristics and advantages of this solution will be further described with the preferred embodiment and the attached drawings.

DETAILED DESCRIPTION OF THE PREFERRED EMBODIMENTS

The description of illustrative embodiments according to principles of the present disclosure is intended to be read in connection with the accompanying drawings, which are to be considered part of the entire written description. In the description of embodiments of the solution disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the solution are illustrated by reference to the exemplified embodiments. Accordingly, the solution expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the solution as presently contemplated. This description is not intended to be understood in a limiting sense, but provides an example of the disclosure presented solely for illustrative purposes by reference to the accompanying drawings to advise one of ordinary skill in the art of the advantages and construction of the solution. In the various views of the drawings, like reference characters designate like or similar parts.

It should be understood that the specific preferred embodiment described here is only intended to interpret this solution, but not used to limit this solution.

Next, we will use the attached drawings of the preferred embodiment of this disclosure to describe the technical design for the preferred embodiment of this solution in a clear and integral manner Obviously, the preferred embodiment described here represents only one, and not all preferred embodiments of this solution. Any other preferred embodiment designed by ordinary technical staff in the area, based on the preferred embodiment of this solution and without creative labour, shall fall under the scope of protection of this invention.

It must be stated that all directional indicators in the preferred embodiment of this solution (such as up, down, left, right, front and back) are only used to describe relative spatial relations and motion statuses between various parts from a specific viewpoint (as illustrated in the attached drawings). If this specific viewpoint changes, such directional indicators will change accordingly, and the said connections may be direct connections.

In addition, "first", "second" and other descriptions used in this solution are only used to describe purposes and shall not be deemed to indicate or imply their relative importance or specify the number of indicated technical features in an implicit manner. Therefore, the features indicated with "first" or "second" can explicitly or implicitly contain at least one such feature. In addition, technical designs for different preferred embodiments can be combined with one another, provided that such a combination can be realized by ordinary technical staff in the area. When the combination between technical designs incurs a mutual conflict or is unrealizable, such a combination of technical designs shall be considered as not existing or falling under the scope of protection required by this disclosure.

As illustrated in FIG. 1, this solution discloses a key clamp for key processing machines, which comprises a base 1, a master clamp 2 as the first clamp and a subordinate clamp 3 as the second clamp, the master clamp 2 and the subordinate clamp 3 have the same structure, and are arranged in parallel on the base 1, and they both have a fixed connection with the base 1. The master clamp 2 comprises at least three clamping jaws and a transmission device, where the clamping jaws are the first clamping jaw 2-2, the second clamping jaw 2-3 and the third clamping jaw 2-4. The first clamping jaw 2-2, the second clamping jaw 2-3 and the third clamping jaw 2-4 are arranged in a row, where the first clamping jaw 2-2 and the third clamping jaw 2-4 are both fixed in relation to the base 1. The second clamping jaw 2-3 are flexibly arranged on the base 1. The second clamping jaw 2-3 fall between the first clamping jaw 2-2 and the third clamping jaw 2-4, the opposite surfaces of the first clamping jaw 2-2 and the second clamping jaw 2-4 jointly constitute the first clamping shape, and the opposite surfaces of the second clamping jaw 2-3 and the third clamping jaw 2-4 jointly constitute the second clamping shape. The transmission device penetrates the first clamping jaw 2-2, the second clamping jaw 2-3 and the third clamping jaw 2-4, and are connected to the second clamping jaw 2-3. The transmission device drives the second clamping jaw 2-3 to move towards the first clamping jaw 2-2 or the third clamping jaw 2-4. In some other preferred embodiments, the master clamp 2 may contain four, five, or six clamping jaws. For example, the master clamp contains four clamping jaws. The four clamping jaws are the first clamping jaw, the second clamping jaw, the third clamping jaw and the fourth clamping jaws, which are arranged in a row. The first clamping jaw and the third clamping jaws 2-4 are both fixed in relation to the base 1; the second clamping jaw and the third clamping jaw are flexibly arranged in relation to the base 1. The second clamping jaw and the third clamping jaw can move between the first clamping jaw and the fourth clamping jaws; two clamping jaws constitute a relative clamping shape to duplicate different keys. The first clamping jaw, the second clamping jaw, the third clamping jaw and the fourth clamping jaws can be flexibly arranged in relation to the base 1. For example, the first clamping jaw and the third clamping jaw are rigidly fixed in relation to the base, while the second clamping jaw and the fourth clamping jaws are flexibly arranged in relation to the base 2. These clamping jaws can be flexibly combined based on the specific situation, and will be omitted here.

In this preferred embodiment, the key clamp of the processing machine comprises a master clamp and a subordinate clamp, which are used to clamp the original key with bitting characteristics and the key blank without bitting characteristics to be duplicated. The master clamp 2 and the subordinate clamp 3 have the same part composition and structural characteristics. To duplicate the key, the user puts the original key in the master clamp 2 and the key blank in the subordinate clamp 3. In this preferred embodiment, the transmission device is a screw 2-1, which penetrates the first clamping jaw 2-2, the second clamping jaw 2-3 and the third clamping jaw 2-4, and is connected to the second clamping jaw 2-3. Rotate the screw 2-1 in different directions; the second clamping jaw will move towards the first clamping jaw or the third clamping jaw 2-4 so as to clamp the key put between the first clamping jaw 2-2 and the second clamping jaw 2-3, or between the third 2-4 and the second clamping jaw 2-3; then, take the steps to duplicate the key. Moreover, the opposite surfaces of the first clamping jaw 2-2 and the second clamping jaw 2-3 jointly constitute the first clamping shape, and the opposite surfaces of the second clamping jaw 2-3 and the third clamping jaw 2-4 jointly constitute the second clamping shape; therefore, the user can duplicate different original keys. To specify, the user can put the key in the clamping shape with the same shape as the key.

In preferred embodiment 1, the first clamping shape and/or the second clamping shape contain(s) at least one jaw opening.

In this preferred embodiment, the clamp has one jaw opening that can duplicate keys with the same tooth shape and process keys with different widths. In other preferred embodiments, the clamp contains a multitude of jaw openings that can duplicate keys in different shapes, thereby ensuring strong universality.

In detail, the aforesaid second clamping jaw 2-3 contain a concave shape, and the said first clamping jaw 2-2 or the said third clamping jaw 2-4 contain the said concave shape as well. The said concave shape of the said second clamping jaw 2-3 and the concave shape of the first clamping jaw 2-2 or the third clamping jaw 2-4 jointly constitute the second jaw opening.

In a preferred embodiment, the first clamping jaw or the second clamping jaw contain a first jaw opening 2-5; the second clamping jaw 2-3 contain a first concave shape, and the first clamping jaw 2-2 or the third clamping jaw 2-4 contain a first concave shape as well. The first concave shape of the second clamping jaw 2-4 and the first concave shape of the first clamping jaw 2-4 or the third clamping jaw jointly constitute the first jaw opening 2-5.

Figure 4:
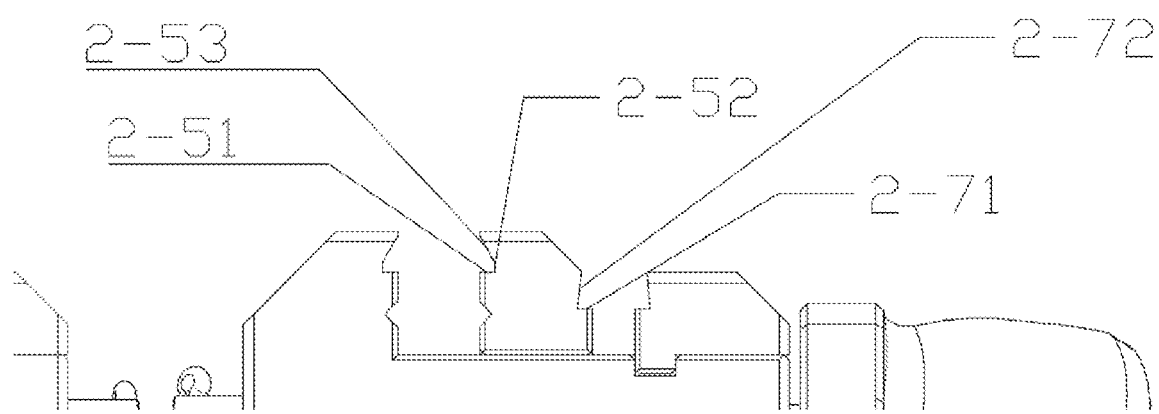
FIG. 4 shows a schematic diagram for the structures of the first jaw opening, the second jaw opening and the third jaw opening of a preferred embodiment for the key clamp of key processing machines under this solution.

As illustrated in FIG. 4, in this preferred embodiment, the said first concave shape comprises a first flat part 2-51, a second flat part 2-52 and a first oblique part 2-53, with both ends of the second flat part 2-52 connected to the first flat part 2-51 and the first oblique part 2-53. In detail, the connecting angle between the first flat part 2-51 and the second flat part 2-52 is a right angle, and the connecting angle between the second flat part 2-52 and the first oblique part is an obtuse angle. The first jaw opening 2-5 is used to clamp an external open tooth key and duplicate the external open tooth key.

In a preferred embodiment, the first clamping jaw or the second clamping jaw contain a second jaw opening 2-6; the second clamping jaw 2-3 contain a second concave shape, and the first clamping jaw 2-2 or the third clamping jaw 2-4 contain a second concave shape as well. The second concave shape of the second clamping jaw 2-3 and the second concave shape of the first clamping jaw 2-2 or the third clamping jaw 2-4 jointly constitute the first jaw opening 2-6.

In this preferred embodiment, the second concave shape is a V shape, and constitutes an included angle which is a right angle or acute angle. The second jaw opening 2-6 is used to clamp a crescent key and duplicate the crescent key.

In a preferred embodiment, the first clamping shape or the second clamping shape contains a third jaw opening 2-7; the second clamping jaw 2-3 contain a third concave shape, and the first clamping jaw 2-2 or the third clamping jaw 2-4 contain a third concave shape as well. The third concave shape of the second clamping jaw 2-4 and the third concave shape of the first clamping jaw 2-4 or the third clamping jaw 2-4 jointly constitute the first jaw opening 2-7.

In this preferred embodiment, the third concave shape comprises a third flat part 2-71 and a second oblique part 2-72. One end of the third flat part 2-71 is connected to one end of the second oblique part 2-72, where the third flat part 2-71 and the second oblique part 2-72 form a connecting acute angle. The third jaw opening is used to clamp a slotted key, or a zigzag key with side milled teeth, or an internal milled tooth key or a dimple key, and duplicate the slotted key, zigzag key with side milled teeth, internal milled tooth key or dimple key.

In a preferred embodiment, the first clamping jaw or the second clamping jaw contain a fourth jaw opening 2-8; the second clamping jaw 2-3 contain a fourth concave shape, and the first clamping jaw 2-2 or the third clamping jaw 2-4 contain a fifth concave shape as well. The fifth concave shape and the fourth concave shape are opposite to one another. The fourth concave shape of the second clamping jaw 2-3 and the fifth concave shape of the first clamping jaw 2-2 or the third clamping jaw 2-4 jointly constitute the fourth jaw opening 2-8.

In this preferred embodiment, the fourth concave shape is vertical to the base 1. The fourth concave shape is a V shape, and constitutes an obtuse angle, and the fifth concave shape is a concave shape. The fourth jaw opening 2-8 is used to clamp a hexagonal key and duplicate the hexagonal key. In some other preferred embodiments, the fourth jaw opening can be set parallel to the base 1.

In some other preferred embodiments, the two concave shapes constituting one jaw opening can be processed in line with the tooth shape of the key. Therefore, if the shapes of the key are symmetric and exactly the same, the concave shapes on both sides of the corresponding jaw opening will be exactly the same. If the shapes of the key are not symmetric, the concave shapes on both sides of the corresponding jaw opening will be different.

In some preferred embodiments, the first clamping shape comprises a first jaw opening 2-5, a second jaw opening 2-6 and a fourth jaw opening 2-8. The first jaw opening and the second jaw opening 2-6 are arranged parallel to the base 1. The directions of the first jaw opening 2-5 and the second jaw opening 2-6 are the same; the first jaw opening is arranged just above the second jaw opening 2-6, and the fourth jaw opening is vertically set in relation to the base 1. The second clamping shape comprises a third jaw opening 2-7; the third jaw opening is arranged parallel to the base 1, and the directions of the third jaw opening 2-7, the first jaw opening 2-5 and the second clamping shape 2-6 are the same. In some other preferred embodiments, the first jaw opening 2-5, the second jaw opening 2-6, the third jaw opening and the fourth jaw opening 2-8 can be freely combined. For example, the first clamping shape comprises a first jaw opening 2-5, a second jaw opening 2-6 and a third jaw opening 2-7: the first jaw opening 2-5, the second jaw opening 2-6 and the third jaw opening 2-7 are arranged parallel to the base 1, and the directions of the first jaw opening 2-5, the second jaw opening 2-6 and the third jaw opening 2-7 are the same. The second clamping shape contains a fourth jaw opening 2-8, and the fourth jaw opening 2-8 is vertically set in relation to the base 1.

In some other preferred embodiments, the first clamping shape or the second clamping shape can set corresponding jaw openings in line with keys with other different shapes to duplicate different keys. In addition, the clamping shape can set different moulds at the jaw openings to carry out a broader scope of key processing.

By the same token, the master clamp 2 and the subordinate clamp have the same structure: the subordinate clamp 3 may contain at last three clamping jaws; the arrangement and connection method of the three clamping jaws are exactly the same as those of the first clamping jaw 2-2, the second clamping jaw 2-3 and the third clamping jaw 2-4 in the master clamp 2; and the clamping shape of the subordinate clamp 3 is the same as that of master clamp 2.

In one preferred embodiment, the clamp for key processing machines also comprises a limiting component, which is arranged at the end of the first clamping jaw 2-2 far from the second clamping jaw 2-3 and rigidly connected to the first clamping jaw 2-2. The limiting component comprises a limiting nut 2-9 and a limiting pin 2-10, where the limiting pin 2-10 passes through the limiting nut 2-9 to form a fixed connection between the limiting nut 2-9 and the limiting pin 2-10. One end of the transmission device crosses out of the first clamping jaw 2-2 and is connected to the limiting nut via thread 2-9, and one end of the transmission device is close to the first clamping jaw.

In this preferred embodiment, the limiting nut 2-9 limits the screw 2-1 to prevent the screw 2-1 from coming loose during rotation, and the locating pin 2-10 is used to fix the limiting nut 2-9 to prevent the limiting nut 2-9 from axial movement or loosening.

In a preferred embodiment, the key clamp for key processing machines also contains a drive device; the said drive device is rigidly connected to the other end of the drive device, and the other end of the drive device is close to the third clamping jaw. In this preferred embodiment, the drive device is a rotary knob 2-11; the rotary knob 2-11 is installed at the head of the screw 2-1 to help rotate the screw 2-1 and better control the screw 2-1. In other preferred embodiments, the drive device is a control part, and the control part can control the transmission device and further propel the transmission device.

In a preferred embodiment, the key clamp for key processing machines also comprises a bearing device: the bearing device is arranged around the transmission device, and arranged at both ends where the second clamping jaw 2-3 contact the first clamping jaw 2-2 and the third clamping jaw 2-4 respectively. In this preferred embodiment, there are two bearing devices, including a first bearing device arranged between the first clamping jaw 2-2 and the second clamping jaw 2-3, and a second bearing device arranged between the third clamping jaw 2-4 and the second clamping jaw 2-3. In other preferred embodiments, when there are 2, 4, 5 or more clamping jaws, the number of bearing devices can be accordingly increased or reduced.

In this preferred embodiment, the bearing device is a thrust bearing 2-12; the limiting nut 2-9 and the limiting pin come into contact with the second clamping jaw 2-3, and separate the limiting nut 2-9 from the limiting pin 2-10 and the second clamping jaw 2-3 through the thrust bearing 2-12. In addition, the thrust bearing has rollers inside. When the screw 2-1 turns, the limiting nut 2-9 and the limiting pin 2-10 will not directly abrade the second clamping jaw 2-3. Therefore, it will convert the thrust against the second clamping jaw in the radial direction into rolling push. This will prevent the friction of a rigid contact, reduce consumption, extend the device's lifespan and reduce repair costs.

This solution also discloses a key processing machine, which comprises the aforesaid key clamp for key processing machines.

Compared to the current technologies, this solution will create the following benefits: the preferred embodiment of this solution provides a key clamp for key processing machines, as well as a key processing machine, which has a multitude of clamping shapes and can clamp house keys and automotive keys with a multitude of structures such as head positioning keys, shoulder positioning keys, tubular keys, hexagonal keys, crescent keys and round keys. It can also clamp keys with a multitude of bit characteristics such as external open tooth keys, external milled tooth keys, internal milled tooth keys and dimple keys. It has the advantages of strong versatility, simple structure, easy use and reliable clamping. At the same time, the key processing machine can substantially improve universality and process a multitude of key types.

The above description of preferred embodiments of the claim does not limit the scope of protection of the present solution. Any equivalent structure or equivalent flow with this specification and contents of the attached drawings, or direct or indirect use of the same in other related technical areas shall fall under the scope of patent protection of this disclosure by the same token.

While the present solution has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure. Furthermore, the foregoing describes the solution in terms of embodiments foreseen by the inventor for which an enabling description was available, notwithstanding that insubstantial modifications of the solution, not presently foreseen, may nonetheless represent equivalents thereto.

The invention claimed is:

1. A key clamp for key processing machines comprising:
a base,
a first clamp and a second clamp having the same structure as the first clamp, wherein the first clamp and second clamp are arranged in parallel on the base, and the first clamp and the second clamp are both connected to the base, wherein the first clamp comprises
at least three clamping jaws and
a transmission device, wherein the at least three clamping jaws comprises
a first clamping jaw;
a second clamping jaw; and
a third clamping jaw arranged in a row, wherein the first clamping jaw and the third clamping jaw are both fixed relative to the base and the second clamping jaw is flexibly installed on the base, wherein
the second clamping jaw is disposed between the first clamping jaw and the third clamping jaw, wherein
a first surface of the first clamping jaw and a first surface of the second clamping jaw facing to the first surface define a first clamping shape, a second surface of the second clamping jaw and a first surface of the third clamping jaw facing to the second surface define a second clamping shape, wherein
the transmission device penetrate the first clamping jaw, the second clamping jaw and the third clamping jaw in turns, and is connected to the second clamping jaw and, wherein the transmission device drives the second clamping jaw to move towards the first clamping jaw or the third clamping jaw, wherein
a first surface of the first clamping jaw comprises a first concave shape, a first surface of the second clamping jaw facing the first surface of the first clamping jaw comprises the first concave shape, wherein the first concave shape of the first clamping jaw and the second clamping jaw is symmetrical to each other, and together the first concave shapes define a first jaw opening between said first concave shapes,
wherein:
the first surface of the first clamping jaw comprises a second concave shape, the first surface of the second clamping jaw facing the first surface of the first clamping jaw comprises the second concave shape, wherein the second concave shape of the first clamping jaw and the second clamping jaw are symmetrical to each other, and together the second concave shapes of the first and second clamping jaws define a second jaw opening between said second concave shapes of the first and second clamping jaws; or a first surface of the third clamping jaw comprises a second concave shape, the first surface of the second clamping jaw facing the first surface of the third clamping jaw comprises the second concave shape, wherein the second concave shape of the third clamping jaw and the second clamping jaw are symmetrical to each other, and together the second concave shapes of the second and third clamping jaws define a second jaw opening between said second concave shapes of the second and third clamping jaws,
wherein said first concave shape comprises a first flat part, a second flat part and a first oblique part, with both ends of the second flat part connected to the first flat part and the first oblique part, respectively, and wherein,
the connecting angle between the first flat part and the second flat part is a right angle, and the connecting angle between the second flat part and the first oblique part is an obtuse angle.

2. The key clamp for key processing machines according to claim 1, wherein
the first clamping shape comprises at least one jaw opening, and/or the second clamping shape comprises at least one jaw opening.

3. The key clamp for key processing machines according to claim 1, wherein the first clamping shape or the second clamping shape comprises a third jaw opening, wherein:
the first surface of the first clamping jaw comprises a third concave shape, the first surface of the second clamping jaw facing the first surface of the first clamping jaw comprises the third concave shape, wherein the third concave shape of the first clamping jaw and the second clamping jaw are symmetrical to each other, and together the third concave shapes of the first and second clamping jaws define the third jaw opening between said third concave shapes of the first and second clamping jaws; or
the first surface of the third clamping jaw comprises a third concave shape, the second surface of the second clamping jaw facing the first surface of the third clamping jaw comprises the third concave shape, wherein the third concave shape of the third clamping jaw and the second clamping jaw are symmetrical to each other, and together the third concave shapes of the second and third clamping jaws define the third jaw opening between said third concave shapes of the second and third clamping jaws.

4. The key clamp for key processing machines according to claim 1, wherein the first clamping shape or the second clamping shape comprises a third jaw opening, wherein:
the first surface of the first clamping jaw comprises a third concave shape, the first surface of the second clamping jaw facing the first surface of the first clamping jaw comprises a fourth concave shape, and together the third concave shape of the first clamping jaw and the fourth concave shape of the second clamping jaw define the third jaw opening between said third concave shape of the first clamping jaw and the fourth concave shape of the second clamping jaw; or
the first surface of the third clamping jaw comprises a third concave shape, the second surface of the second clamping jaw facing the first surface of the third clamping jaw comprises a fourth concave shape, and together the third concave shape of the third clamping jaw and the fourth concave shape of the second clamping jaw define the third jaw opening between said third concave shape of the third clamping jaw and the fourth concave shape of the second clamping jaw.

5. The key clamp for key processing machines according to claim 1, wherein
   the key clamp also comprises a limiting component, wherein
   the limiting component is arranged at the end of the first clamping jaw far from the second clamping jaw, and rigidly connected to the first clamping jaw, wherein
   the limiting component comprises a limiting nut and a limiting pin, wherein
   the limiting pin passes through the limiting nut to form a fixed connection between the limiting nut and the limiting pin, wherein
   one end of the transmission device crosses out of the first clamping jaw, and is connected to the limiting nut via a thread.

6. The key clamp for key processing machines according to claim 1, wherein
   the key clamp also comprises a drive device; and wherein
   the drive device is rigidly connected to the other end of the transmission device.

7. The key clamp for key processing machines according to claim 1, wherein
   the key clamp also comprises a bearing device, wherein
   the bearing device is arranged around the transmission device, and at both ends where the second clamping jaw contacts the first clamping jaw and the third clamping jaw, respectively.

8. A key processing machine, wherein the key processing machine includes a key clamp for key processing machines of claim 1.

9. The key clamp for key processing machines according to claim 1, wherein the transmission device is a screw, which penetrates the first clamping jaw, the second clamping jaw, and the third clamping jaw, and is connected to the second clamping jaw.

10. The key clamp for key processing machines according to claim 1, wherein the second concave shape is a V shape and further comprises a right angle or an acute angle.

\* \* \* \* \*